United States Patent [19]

Jefferys

[11] Patent Number: 4,949,500
[45] Date of Patent: Aug. 21, 1990

[54] INSECT OR VERMIN TRAP

[75] Inventor: Gregory Jefferys, Queensland, Australia

[73] Assignees: Lawrence V. M. Stone, Chelmer; Robert C. J. Van Mourik, St. Lucia, both of Australia

[21] Appl. No.: 137,537
[22] PCT Filed: Feb. 19, 1987
[86] PCT No.: PCT/AU87/00046
 § 371 Date: Oct. 14, 1987
 § 102(e) Date: Oct. 14, 1987
[87] PCT Pub. No.: WO87/04901
 PCT Pub. Date: Aug. 27, 1987

[30] Foreign Application Priority Data

Feb. 20, 1986 [AU] Australia ............... PH4707

[51] Int. Cl.$^5$ .................................. A01M 19/00
[52] U.S. Cl. ................................. 43/98; 43/112
[58] Field of Search ..................... 43/98, 112

[56] References Cited

U.S. PATENT DOCUMENTS

| 2,191,229 | 2/1940 | Ford | 43/98 |
| 2,229,300 | 1/1941 | Montroy | 43/98 |
| 2,441,499 | 5/1948 | Medlin | 43/98 |
| 3,468,054 | 9/1969 | Levine | 43/98 |
| 3,815,278 | 6/1974 | Beaton | 43/99 |
| 3,827,176 | 8/1974 | Stirewalt | 43/98 |
| 4,165,577 | 8/1977 | Shanahan et al. | 43/112 |
| 4,205,480 | 6/1980 | Gartner | 43/98 |
| 4,497,130 | 2/1985 | Fitzgerald | 43/98 |

FOREIGN PATENT DOCUMENTS

| 127949 | 6/1948 | Australia . | |
| 2650385 | 5/1978 | Fed. Rep. of Germany | 43/112 |

Primary Examiner—Nicholas P. Godici
Assistant Examiner—Michael William Starkweather
Attorney, Agent, or Firm—Nilsson, Robbins, Dalgarn, Berliner, Carson & Wurst

[57] ABSTRACT

An insect or vermin trap having a main housing and high voltage generating means within the housing. The generating means generates a voltage of sufficient magnitude for exterminating insects, vermin or the like entering the trap. One or more entries into the main housing when the electrodes are in that housing or into the separate housing if the electrodes are in a separate housing the the entries enabling insects or vermin to enter the trap. Two spaced electrodes either within the main housing or separate housing supplied with the voltage generated by the generating means for exterminating insects or the like which bridge the space between the electrodes. Control means is present for providing controlled alternation between an on period for which the electrodes are supplied with the high voltage and an off period for which the electrodes are not supplied with the voltage.

14 Claims, 3 Drawing Sheets

INSECT OR VERMIN TRAP

The invention relates to an insect or vermin trap. In particular, the invention relates to a trap which lures and exterminates cockroaches.

The invention will be described by way of example with reference to its use as a cockroach trap but it should be appreciated that this is by way of example only and that the trap of the invention may be for the vermin and insects.

Research has shown that cockroaches have an affinity for warm, dark places and are attracted by the smell of organic material such as foodstuffs. In addition cockroaches sometimes seek out humid areas although their affinity for humidity is perhaps not as great as it is for dark warm areas.

Cockroaches are currently either trapped and/or exterminated in a variety of ways. Poisons have been used. Research has shown that cockroaches, like some other insects, may develop an immunity or tolerance to certain poisons. In addition cockroaches appear to have a survival mechanism which, if the inset suspects it is dying, causes the insect to lay eggs before its demise. Thus, whilst the mature cockroach may ultimately be killed it is usually able to produce hundreds of offspring before it is exterminated. Thus the cockroach population may in fact be increased where poisons are employed. In addition to this potentially dangerous chemicals need to be stored.

Cockroach traps are known. Some of these traps enable the cockroach to enter but not leave the environment of the trap. The trap needs to be periodically emptied and does not quickly and efficiently kill the cockroaches. In addition such traps sometimes include poisons to kill the insect once it enters the trap. Thus the trap may be passive and contain no poison or be an active trap with poison and have all the disadvantages associated with the use of poisons mentioned above.

Traps utilising high voltage grids or electrodes to kill insects are also known. Such traps are intended primarily for flying insects and have open grid like electrodes surrounded by a safety grid or screen. These traps are unsuitable for cockroaches because by the very nature of their construction are substantially unenclosed and hence do not provide any darkened area. These traps usually have a lamp to attract the insects. The method of operation is such that insects are attracted to the light and whether or not they bridge the electrified grids is left to chance. Such traps, because they are not enclosed are dangerous because the grids are accessible.

It is an object of the invention to provide an improved vermin trap which alleviates or minimises the disadvantages mentioned above.

Accordingly, the invention provides a trap for exterminating insects, including a main housing, high voltage generating means within the housing for generating a voltage or sufficient magnitude for exterminating insects, entering the trap, two spaced electrodes within the main housing and in use being supplied with the high voltage generated by the generating means for exterminating insects, one or more entries into the housing within which the electrodes are located, insects which bridge the space between the electrodes and control means for providing controlled alternation between an on period for which the electrodes are supplied with the high voltage and an off period for which the electrodes are not supplied with the voltage.

The housing may be any convenient or suitable size and shape. The housing may have a prismatic shape such as square or rectangular. The housing may have a body portion and a lid or cover. The lid may be removable from the body portion and may be secured thereto in any suitable fashion. With the lid in place the space between the housing is relatively dark. Screw fasteners may be used to removably secure the lid to the body portion. The housing includes one or more entries through which cockroaches may enter the housing. The entries may comprise apertures in the body portion. The housing may be made of non-conducting material.

The generating means generates a voltage of sufficient magnitude to kill and/or disintegrate any cockroaches entering the trap. Preferably the voltage produced by the generating means is about 3.5 kv although higher or lower voltages may also be employed. The voltage may be between 1 kv and 6 kv. The generating means may include voltage multiplying means or step-up transformer or combinations of both of these. Where a step up transformer is used it should be one capable of having its secondary winding shorted out for a short period of time. A preferred transformer which has been found suitable is a 10 ma leakage breaker transformer HT210C made by the Ferguson Company or equivalent. The transformer may be mounted within the housing.

It is preferred that a transformer be employed to generate the high voltage.

The control means provides for controlled alternation between on and off periods for the trap. The control means may include a timer. The timer may be an electrically controlled one, a mechanically controlled one or a combination of both of these. In one example a timing motor may be employed to provide this cyclic operation of the trap. A timing circuit may be used to provide for cyclic operation. The circuit may establish cyclic on and off periods of the high voltage. Preferably the on period is short compared to the off period. Suitable periods are 30 seconds on and 20 minutes off although other time periods may be employed. It is particularly preferred that the on and off periods be 5 seconds and 7 minutes respectively. The timing circuit may include an oscillator for generating timing pulses in response to which power to the voltage generator may be commenced or terminated.

The electrodes are connected to the high voltage produced by the generator. These electrodes are located within the housing. Thus, the electrodes have a potential difference imposed across them and any cockroach that simultaneously contacts both electrodes will be electrocuted. The electrodes may be foaminous or continuous. Preferably, the electrodes separate the generator from the remainder of the space within the housing. Preferably the electrode closest to the generator extends completely across the housing to ensure that cockroaches cannot enter that part of the housing. The other electrode may form a substantial base closure for the housing. If this is the case it is preferred that that electrode be connected to a reference potential. Alternatively a separate base may be provided and in which case the potential difference across the electrodes may be left floating.

The electrodes may take the form of plates or spaced wires arranged in a grid pattern. The electrodes may be placed on a non-conducting support.

It is preferred that the other electrode be made at least partially removable from the housing to enable killed and/or disintegrate cockroaches to be removed. Alternatively the other electrode may be such as to provide a base aperture between it and the housing and the trap may be emptied by tilting to ensure that killed cockroaches fall out of the housing.

The spacing between the electrodes may be made adjustable to make the trap suitable for insects of varying sizes. Cockroaches and other insects with feelers do not require the electrode spacing of the trap to be variable because these feelers tend to bridge the gap. Thus, in a sense the trap of the invention is "universal" in that it is effective for insects of different sizes and as a rule does not require adjustment.

To attract cockroaches to enter the housing and enter between the electrodes a suitable attractant may be placed on one or both of the electrodes or otherwise associated with the electrodes. Any suitable organic matter may be employed as an attractant. Alternatively a synthetic attractant may be used. One material found suitable as an attractant is propyelcyclohexan acetate although other substances may be used.

A particular preferred embodiment is shown by way of example in the accompanying drawings in which.

Figure 1:
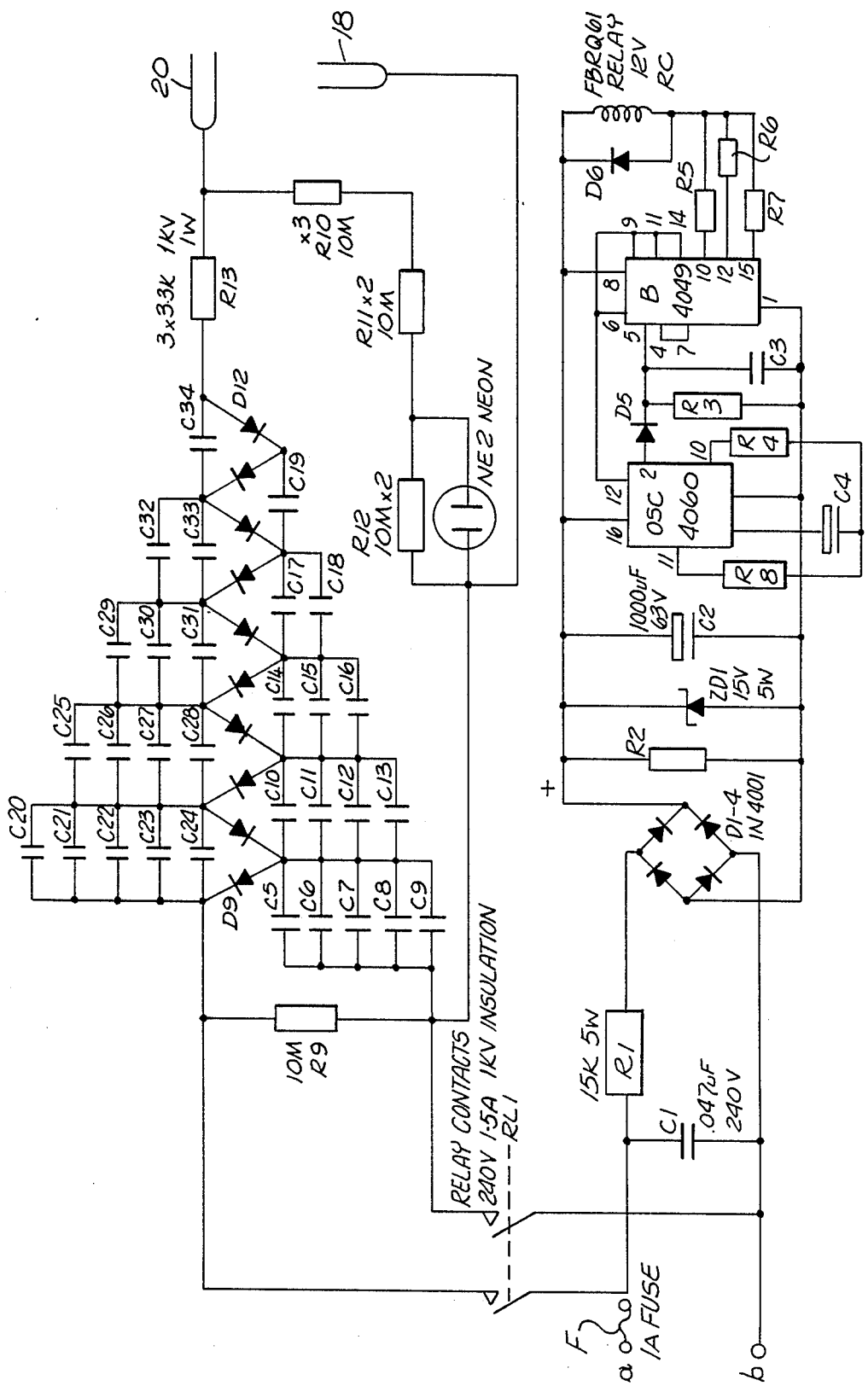
FIG. 1 is a view of a preferred circuit according to an embodiment of the invention.

FIG. 1 shows a preferred circuit according to the invention. The circuit includes a high voltage ladder network comprising a voltage multiplyer consisting of a ladder network of diodes D9 and capacitors C5 to C34. If desired each parallel combination of capacitors could be replaced by a single equivalent capacitor of suitable value. The capacitors may each be 0.33 $\mu$F 240 Vac capacitors and in which case where no load appears across the electrodes E1, E2 and 6 KV output may be present. With a load of 60 Mohm the output may typically be 2.5 KV.

A supply of AC voltage is provided at terminals a, b. A fuse F is connected in series with terminal a and relay contacts RL1 enable the AC voltage to be switched to the voltage multiplyer. Capacitor C1 is coupled across terminals, a, b for RF suppression whilst resistor R1 is a mains voltage dropping resistor.

Bridge rectifier D1 to D4 provide for full wave rectification of the AC voltage. This rectified voltage is applied to load resistor R2. Zener diode ZD1 and filter capacitor C2 provide a regulated 15 V supply for the remainder of the circuit. An oscillator OCS is shown comprising an oscillator chip 4060 such as MCI4060B made by Motorola Inc. The oscillator provides a train of pulses at its output terminal 2 the frequency of which is dependant upon timing components R8 and C4. These components provide a 1200 second time delay. Components R3 and C3 together provide a 30 second time delay. A buffer circuit or driver B receives the output provided by timing components R3 and C3. The output from the buffer is coupled to the anode of flywheel diode D6 when theoutput is low relay coil RC is energized and contacts RL1 close. Conversely, the coil is de-energized when the output is high and the contacts remain open. The circuit is such that the contacts are closed for 30 seconds and open for twenty minutes. This is achieved by the two timing circuits. With the contacts closed a high voltage is impressed across the electrodes 18, 20.

Resistors R10, R11 and R13 are in series with one another and provide a current limit for current supplied to neon light NE. Resistor R12 is coupled in parallel with neon light NE to provide a discharge path. The neon light indicates that a high voltage is present across the electrodes. Resistors R5, R6 and R7 are current limiting resistors.

Figure 2:
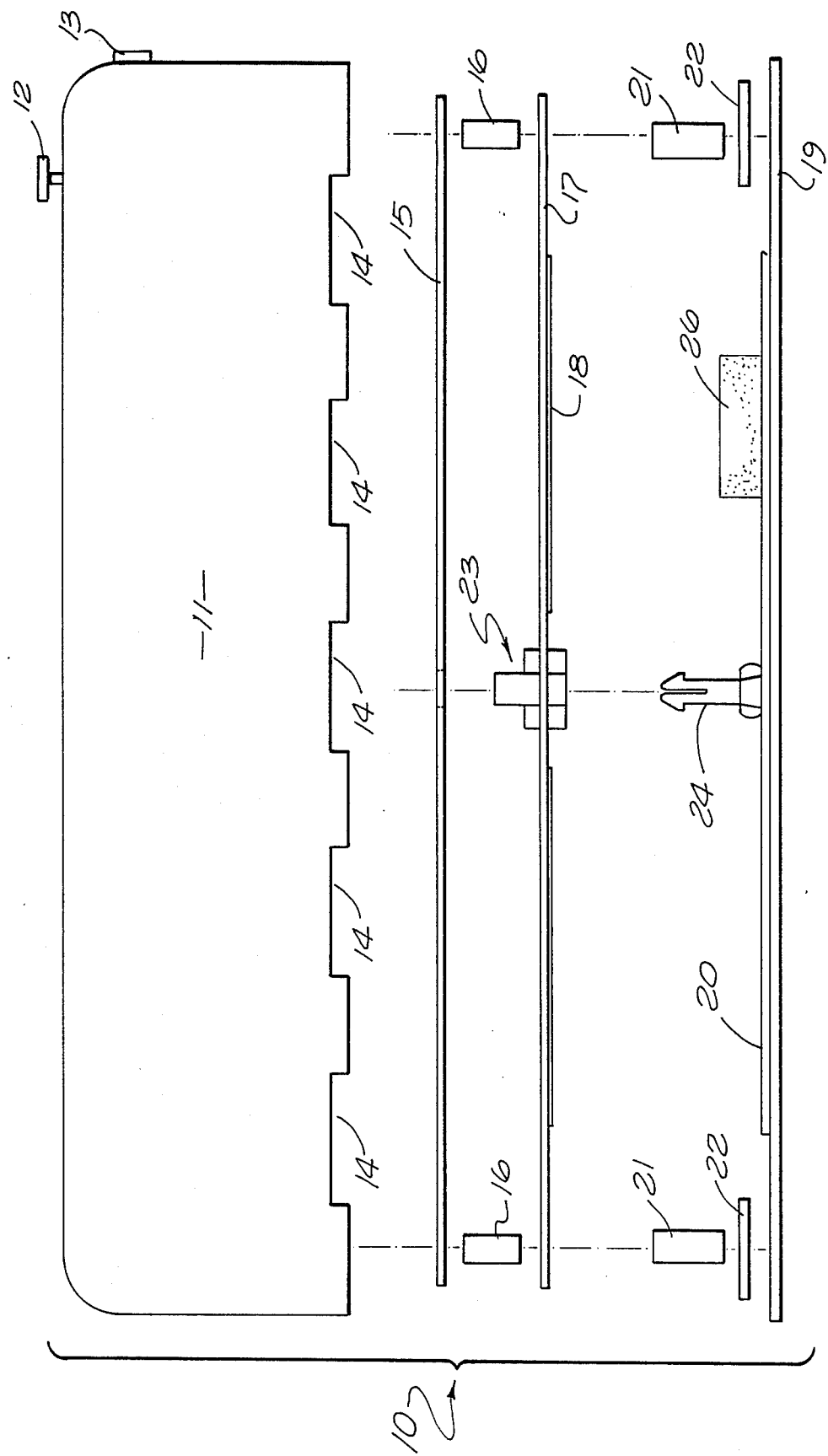
FIG. 2 is an exploded view of a trap according to an embodiment of the invention; and, FIG. 3 is a view of an alternative circuit to that of FIG. 1.

FIG. 2 shows an exploded view of a trap 10 according to an embodiment of the invention. The trap 10 includes a housing 11 in the form of a cover. The housing 11 has a self test switch or button 12 which projects outwardly therefrom. The button 12 may function to cause the cirucit of FIG. 1 to develop a high voltage potential across the electrodes for as long as the button is pressed. That is, it overides contacts RL1. Thus, neon NE lights up for as long as the button is pressed to provide an indication that the trap is functioning. An inlet 13 is provided for a power lead. The inlet may simply be an aperture in a wall of the housing 11. A grommet may be fitted in this aperture.

The housing 11 has a plurality of cut outs 14 which enable cockroaches to enter the interior of the housing.

Figure 3:
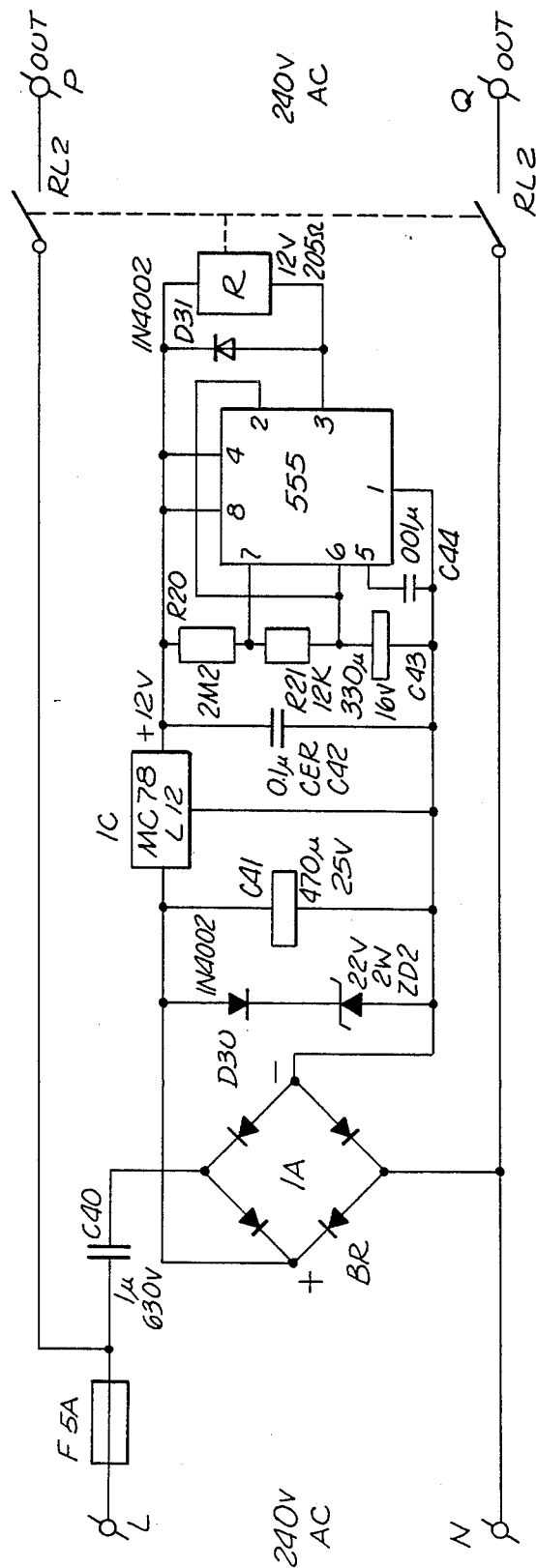

The circuit of FIGS. 1 or 3 has components mounted to printed circuit board 15 normally located within the housing 11. Board 15 is spaced by insulating spacers 16 from a support plate 17 to which a first electrode 18 is mounted.

A cover 19 seals off the housing 11 but cut outs 14 remain. A second electrode 20 is mounted to the inside surface of the cover 19. Cover 19 is spaced from support plate 17 by insulating spacers 21. For added protection an earthed end strip 22 may extend around the periphery of the cover 19.

A socket 23 is mounted on support 17. The socket 23 co-operates with a plug 24 mounted on the second electrode. The plug and socket are arranged to function so that if the cover is removed from the housing 11 the supply of a high voltage potential between the electrodes is interrupted and cannot be re-established until the plug mates with the socket.

The circuit of FIG. 3 is in many respects similar to that shown in FIG. 1. The major difference is the deletion of the multiplying ladder network. In FIG. 3 the line or active is supplied to terminal L whilst the return or neutral is coupled to terminal N a five amp fuse F. Capacitor C40 is in series with diode bridge BR. The full wave rectified output from the bridge BR is filtered and stabilised by diodes D30 and ZD2 and capacitor C41. A voltage regulator IC supplies a regulated 12 VDC across capacitor C42. A timer such as device 555 has timing resistors R20, R21, C43 and C44 associated therewith. Capacitor C43 is responsible for an on period of 5 seconds whilst C44 is responsible for an off period of about 7 minutes. Output from pin 3 of timer 555 controls relay R which in turn operates contacts RL2. Diode D31 is a flywheel diode. When output 3 is low relay R is energized and power is supplied to terminals P, Q. When the output is high no power is supplied. Terminals P, O are coupled to a step up transformer which provides a high voltage between 1000 to 6000 V or greater although a lower voltage than 1 kv may be supplied to the transformer. The transformed secondary winding is coupled to electrodes 18, 20.

The trap functions as follows. A cockroach enters the housing through a cut out 14 to eat bait deposited on electrode 20 or located between the electrodes 18 and 20. The spacing of the electrodes is such that it is readily bridged by the cockroach. As mentioned above the electric potential between the electrodes is switched such that a 20 minute period exists where there is no high voltage applied and 30 seconds where the voltage is applied. The trap cycles through these on and off periods. It has been found that if the voltage potential is continuously maintained between the electrodes cockroaches are reluctant to enter the trap. Whilst the reason for this is not certain it is believed that the cockroaches are sensitive to high electric fields. Once the cockroach is within the trap it bridges between the electrodes and is electrocuted when the high voltage is applied for the 30 second time interval. The cover may be periodically removed to clean the trap.

The trap of the invention provides a convenient dark space into which cockroach may enter. The power losses in the electronic components provide some heating of the space within the housing and is useful when all components are in the one housing to provide some heating of that space. The trap may easily be emptied and if desired a separate tray within which dead cockroaches may collect can be provided. Alternatively, the second electrode may double as a tray. No poisonous chemicals need be used. The trap does not require frequent emptying because the high voltage tends to disintegrate the cockroach.

I claim:

1. A trap for exterminating insects such as cockroaches comprising: a main housing having a body portion and a removable cover; high voltage generating of sufficient magnitude for exterminating insects entering the trap; two electrodes within the main housing coupled to said high voltage generating means; said electrodes being mounted on electronically non-conducting supports and arranged spaced from each other in separate planes and extending substantially along and across the housing in which they are located and covering an area providing numerous locations at which insects may be exterminated when the electrodes are supplied with the high voltage from said high voltage generating means; the support for one electrode forms said cover; at least one entry into the housing in which the electrodes are located to allow insects to enter between the electrodes at any time; and control means connected for providing controlled alternation between an off period for which the electrodes are not supplied with the high voltage and an on period for which the electrodes are supplied with the high voltage during which insects which bridge or substantially bridge the space between the electrodes are exterminated.

2. The trap of claim 1 wherein the electrodes are planar.

3. The trap of claim 1 wherein the electrodes are parallel.

4. The trap of claim 1, wherein the main housing has a body portion and a removable cover.

5. The trap of claim 1, which further includes a plurality of entries each of which comprises an aperture in the body portion ajdacent, the cover.

6. The trap of claim 1, wherein the generating means generates a voltage between 1 kv and 6 kv.

7. The trap of claim 1, wherein the voltage generated by the generating means is about 1 kv.

8. The trap of claim 1, wherein the generating means comprises a step up transformer.

9. The trap of claim 1, wherein the electrodes are either foraminous sheets, continuous sheets, plates or a grid pattern of spaced wires.

10. The trap of claim 1, wherein one said electrode extends completely across the main or separate housing and forms a chamber for housing the control means and generating means and prohibits insects from entering the chamber .

11. The trap of claim 1, wherein the spacing between the electrodes is adjustable.

12. The trap of claim 1, wherein said control means includes a timer for controlling the generating means to provide for on and off periods of a respective duration of 5 seconds and 7 minutes.

13. The trap of claim 1, including an attractant on one or both said electrodes.

14. A trap for exterminating insects such as cockroaches comprising: a main housing; high voltage generating means including a multiplying circuit having a ladder net work of diodes and capacitors within the main housing for generating a voltage of sufficient magnitude for exterminating insects entering the trap; two electrodes within the main housing coupled to said high voltage generating means; and electrodes being arranged spaced from each other in separate planes and extending substantially along and across the housing in which they are located and covering an area providing numerous locations at which insects may be exterminated when the electrodes are supplied with the high voltage from said high voltage generating means at least one entry into the housing in which the electrodes are located to allow insects to enter between the electrodes at any time; and control means connected for providing controlled alternation between an off period for which the electrodes are not supplied with the high voltage and an on period for which the electrodes are supplied with the high voltage during which insects which bridge or substantially bridge the space between the electrodes are exterminated.

* * * * *